United States Patent
Bouchard et al.

[11] Patent Number: 6,164,621
[45] Date of Patent: Dec. 26, 2000

[54] SIMPLIFIED PIEZOELECTRIC VALVE

[75] Inventors: Clement D. Bouchard, Pembroke; Kevin Lee Grant, Manchester; John William Hillis, Hooksett; Patrick J. F. Hurley, Manchester; William W. Ormerod, III, Hooksett, all of N.H.

[73] Assignee: Deka Products Limited Partnership, Manchester, N.H.

[21] Appl. No.: 09/350,495

[22] Filed: Jul. 9, 1999

[51] Int. Cl.⁷ ................................................. F16K 31/02
[52] U.S. Cl. ....................................................... 251/129.06
[58] Field of Search .................... 251/129.06, 129.01; 137/625.44, 625.65

[56] References Cited

U.S. PATENT DOCUMENTS

| | | | |
|---|---|---|---|
| 2,171,243 | 8/1939 | McKesson et al. | 171/32 |
| 2,478,223 | 8/1949 | Argabrite | 171/327 |
| 2,596,409 | 5/1952 | Johnson et al. | 137/139 |
| 2,928,409 | 3/1960 | Johnson et al. | 137/82 |
| 3,029,743 | 4/1962 | Johns | 103/150 |
| 3,093,710 | 6/1963 | Ten Eyck | 179/110 |
| 3,465,732 | 9/1969 | Kattchee | 123/32 |
| 4,304,257 | 12/1981 | Webster | 137/559 |
| 4,340,083 | 7/1982 | Cummins | 251/129.06 |
| 4,492,360 | 1/1985 | Lee, II et al. | 251/129 |
| 4,567,394 | 1/1986 | Frisch | 310/330 |
| 4,617,952 | 10/1986 | Fujiwara et al. | 137/85 |
| 4,858,883 | 8/1989 | Webster | 251/61.1 |
| 5,203,537 | 4/1993 | Jacobs et al. | 251/192.06 |
| 5,343,894 | 9/1994 | Frisch et al. | 137/625.65 |
| 5,447,286 | 9/1995 | Kamen et al. | 251/30.02 |
| 5,460,202 | 10/1995 | Hanley et al. | 251/129.06 |
| 5,630,440 | 5/1997 | Knutson et al. | 137/82 |
| 5,779,218 | 7/1998 | Kowanz | 251/129.06 |
| 6,017,016 | 1/2000 | Jackson | 251/129.06 |
| 6,024,340 | 2/2000 | Lazaraus et al. | 251/129.06 |

FOREIGN PATENT DOCUMENTS 0105082  4/1989  Japan ................ 251/129.06

*Primary Examiner*—Gregory L. Huson
*Assistant Examiner*—Ramesh Krishnamurthy
*Attorney, Agent, or Firm*—Bromberg & Sunstein LLP

[57] ABSTRACT

A simplified two-way piezoelectric-actuated valve is described. The valve has a valve body having an internal valve cavity, a pair of generally opposed positioning members integral to the valve body, and first and second ports. At least one of the ports has a valve seat and a passageway in communication with the valve seat, the seat and the passageway being integrally formed in the valve body. A piezoelectric actuator has first and second ends. The first end is secured within the valve cavity by the positioning members and has electrical contacts for providing an electric potential to control the position of the second end. The second end is capable of flexing between a closed position with respect to the valve seat and an open position with respect to the valve seat. A three-way version of the valve is also described, as is a method of manufacturing such valves.

49 Claims, 5 Drawing Sheets

SIMPLIFIED PIEZOELECTRIC VALVE

TECHNICAL FIELD

The present invention relates to valves employing a piezoelectric actuator.

BACKGROUND ART

It is well known that certain materials possess piezoelectric properties such that when an electric potential is applied, a mechanical stress is produced within the material causing it to deflect. Such materials include simple naturally occurring and artificial crystals, and more sophisticated artificial ceramic materials.

One application of such piezoelectric materials is as valve actuators. In such applications, thin sheets of piezoelectric ceramic material may be laminated to an electrode sheet. A monomorph is an electrode sheet with a piezoelectric layer on one side. A bimorph has piezoelectric layers on both sides. A cantilever-fashion piezoelectric valve has an actuator in which one end of a piezoelectric material beam is securely clamped, and application of electric potential to the clamped end causes the free end to deflect with respect to a valve seat to prevent or enable fluid flow through the valve seat.

Generally, prior piezoelectric actuated valves have been designed for very specific applications, and as such, either have incorporated significant application-specific internal structure, e.g., U.S. Pat. No. 4,492,360 to Lee, II et al., or have been part of a significantly more complex larger structure, e.g., U.S. Pat. No. 4,340,083 to Cummins. Besides being suitable for only a narrow range of applications, the structural complexity necessary substantially affects the manufacturing complexity and disadvantageously increases the cost required to produce such valves.

Another consideration in the field of piezoelectric valves is the tradeoff which must be made between actuator force and physical displacement—a cantilevered piezoelectric actuator has a decreasing linear relation between the force that the actuator can apply, and the physical displacement of the end of the actuator. For example, maximum force may be produced when the actuator displacement is zero, in which case, force decreases linearly with displacement. Thus, a design tradeoff must be made since a non-zero force must be applied to seat the free end of the actuator on a valve seat without having leakage. Because of the force-displacement relationship, this non-zero force translates into a maximum distance that the free end of the actuator can sit above the valve seat. On the other hand, to open the valve, the free end of the actuator must be some minimum distance above the valve seat to obtain maximum fluid flow through the valve.

The difference between the maximum and minimum distances that the free end of the actuator can sit above the valve seat is typically relatively small, e.g., ~100 microns. This presents a difficult problem for low-cost manufacturing where dimensional tolerances tend to be fairly large. As a result, complicated assembly procedures and/or additional structure have typically been required, which in turn increase the manufacturing cost.

SUMMARY OF THE INVENTION

A preferred embodiment of the present invention includes a simplified two-way piezoelectric valve. The valve includes a valve body having an internal valve cavity, a pair of generally opposed positioning members integral to the valve body, and first and second ports. At least one of the ports includes a valve seat and a passageway in communication with the valve seat, the seat and the passageway being integrally formed in the valve body. The valve also has a piezoelectric actuator having first and second ends. The first end is secured within the valve cavity by the positioning members and has electrical contacts for providing an electric potential to control the position of the second end. The second end is capable of flexing between a closed position with respect to the valve seat, and an open position with respect to the valve seat.

A preferred embodiment also includes a simplified three-way piezoelectric valve. Such a valve includes a valve body having an internal valve cavity, a pair of generally opposed positioning members integral to the valve body, and a first port, a second port, and a common port. The first port and the second port each have a valve seat and a passageway in communication with the valve seat, the seat and the passageway being integrally formed in the valve body. The valve also has a piezoelectric actuator having first and second ends. The first end is secured within the valve cavity by the positioning members and has electrical contacts for providing an electric potential to control the position of the second end. The second end is capable of flexing between a first operating position in which the first port is closed and the second port is open, and a second operating position in which the first port is open and the second port is closed.

In a further embodiment of either the two-way or three-way valve, the valve body may include a valve housing having one of the positioning members, and a valve cover having the other positioning member. The actuator may further include a valve seat pad of resilient material attached to the second end to sealingly engage the second end against a valve seat that is closed.

In one embodiment of either the two-way or three-way valve, the valve body may further have a plurality of external surfaces, including one surface having disposed thereon openings for the ports. In such an embodiment, the piezoelectric actuator may lie in a plane that is either substantially parallel to, or substantially perpendicular to the surface having the openings. In addition, or alternatively, the surface having the openings may be part of a manifold mounting flange structure. There may also be an integrated seal associated with the external surface openings for the ports.

An embodiment of either the two-way or three-way valve may also include an actuator voltage module integrated into the valve body and electrically connected to the electrical contacts of the piezoelectric actuator, that generates the electric potential to control the second end of the piezoelectric actuator. There may be a control processor which is integrated into the valve body and electrically connected to the electrical contacts of the piezoelectric actuator, and which controls fluid flow through the valve by controlling the position of the second end of the piezoelectric actuator. A pressure transducer in communication with the valve cavity may monitor fluid pressure within the valve cavity for at least one of controlling fluid flow through the valve and detecting faulty valve operation. The valve cavity may include a potting chamber portion that is substantially filled with potting material to enhance the securing of the first end of the piezoelectric actuator by the positioning members.

In one embodiment of either the two-way or three-way valve, the valve seat may be either cylindrical-shape or volcano-shape and protrude into the valve cavity. In such an embodiment, the valve seat may further be radially surrounded by a valve seat lip. A volcano-shape valve seat may include an end tip having a relatively small radius of curvature that gradually increases to a relatively larger radius of curvature so as to form a transition to the port passageway.

In an embodiment of either the two-way or three-way valve, the portion of the valve cavity containing the first end of the actuator may have a volume less than or equal to four times the volume of the first end of the actuator within the portion. Alternatively, the portion of the valve cavity containing the second end of the actuator may have a volume less than or equal to four times the volume of the second end of the actuator within the portion. In another embodiment, the portion of the valve cavity containing the second end of the actuator may be configured so that the second end of the actuator deflects through more than one quarter the volume of the portion when flexing between the closed position and the open position.

A preferred embodiment also includes a method of manufacturing a two-way piezoelectric valve. Such a method includes providing a valve body having an internal valve cavity, a pair of generally opposed positioning members integral to the valve body, and first and second ports. At least one of the ports includes a valve seat and a passageway in communication with the valve seat, the seat and the passageway being integrally formed in the valve body. The method includes suspending a piezoelectric actuator having first and second ends. The first end has electrical contacts for providing an electric potential to control the position of the second end. The first end contacts one of the positioning members and the second end contacts the valve seat without bending or flexing the actuator. The method also includes securing the first end of the piezoelectric actuator to the positioning members.

An alternative embodiment also includes a method of manufacturing a three-way piezoelectric valve. The method includes providing a valve body having an internal valve cavity, a pair of generally opposed positioning members integral to the valve body, and first, second, and common ports. The first port and the second port each have a valve seat and passageway in communication with the valve seat, the seat and the passageway being integrally formed in the valve body. The method also includes suspending a piezoelectric actuator having first and second ends. The first end has electrical contacts for providing an electric potential to control the position of the second end. The first end contacts one of the positioning members and the second end contacts one of the protruding valve seats without bending or flexing the actuator. The method also includes securing the first end of the piezoelectric actuator to the positioning members.

In a further embodiment of the method of manufacturing either the two-way or three-way valve, before the suspending, the method may further include attaching a valve seat pad of resilient material to the second end of the piezoelectric actuator. The suspending may also include supplying a vacuum pressure to a port with a valve seat so that the second end of the piezoelectric actuator is held against that valve seat. The suspending may utilize a special positioning fixture to hold and position the piezoelectric actuator. The suspending may utilize shimming tapes to position the piezoelectric actuator. The securing may utilize ultraviolet-curable adhesive. The securing may substantially fill the potting chamber with adhesive material. The method may further include attaching a top cover over the valve body to enclose the valve cavity such that the valve cavity is accessible to fluid only via the valve ports. The suspending may also include electrically connecting the first end of the actuator to an electric power supply and applying a voltage to the actuator such that the second end of the actuator flexes away from contacted valve seat, and the attaching includes measuring a force required to position the top cover pressing against the flexed second end of the actuator. In such a method, the attaching may further include pressing the top cover against the flexed second end of the actuator until the force measured equals a minimum value of force.

A preferred embodiment is also directed to a valve having an improved valve seat. The valve includes a valve body having an internal cavity and first and second ports, at least one of the ports having a valve seat and a passageway in communication with the valve seat, the seat and the passageway being integrally formed in the valve body. The valve also includes a valve actuator capable of operating between a closed position with respect to the valve seat and an open position with respect to the valve seat. The valve seat has a volcano shape including an end tip having a relatively small radius of curvature that gradually increases to a relatively larger radius of curvature so as to form a transition to the port passageway.

In such an embodiment, the actuator may further include a valve seat pad of resilient material to sealingly engage the actuator against the valve seat when the actuator is in the closed position. The valve body may further have a plurality of external surfaces, including one surface having disposed thereon openings for the ports. In such an embodiment, the actuator may lie in a plane that is either substantially parallel to, or substantially perpendicular to the surface having the openings. In addition, or alternatively, the surface having the openings may be part of a manifold mounting flange structure. There may also be an integrated seal associated with the external surface openings for the ports.

In a further embodiment, the valve may also include a control processor which is integrated into the valve body and electrically connected to the actuator, and which controls fluid flow through the valve by controlling the position of the actuator. A pressure transducer in communication with the valve cavity may monitor fluid pressure within the valve cavity for at least one of controlling fluid flow through the valve and detecting faulty valve operation. The valve cavity may have a volume less than or equal to four times the volume of the actuator within the cavity.

A preferred embodiment includes a valve having a valve body and a piezoelectric actuator. The valve body has an internal valve cavity, a pair of generally opposed positioning members integral to the valve body, which divide the cavity into an operating chamber and a potting chamber, wherein the operating chamber is defined in part by first and second chamber walls, and first and second ports, at least one of the ports including a valve seat and a passageway in communication with the valve seat, wherein the valve seat is located in a recess in the first wall. The piezoelectric actuator has first and second ends. The first end is secured within the valve cavity between the positioning members and has electrical contacts for providing an electric potential to control the position of the second end. The second end is capable of flexing between a closed position with respect to the valve seat and an open position with respect to the valve seat. A valve seat pad is mounted on the second end of the piezoelectric actuator for sealing the valve seat when the piezoelectric actuator is in the closed position, such that the valve seat pad extends into the recess, past a plane defined by the first wall, when the piezoelectric actuator is in the closed position.

In a further related embodiment, the valve seat extends into the recess. Such a valve may further include a valve housing having one of the positioning members, and a valve cover having the other positioning member. The valve seat may have a top that is radially surrounded by a valve seat lip. The valve seat may have a cylindrical shape, or a volcano shape which may include an end tip having a relatively small radius of curvature that gradually increases to a relatively larger radius of curvature so as to form a transition to the port passageway. In addition, or alternatively, either the potting chamber or the operating chamber, or both may have a volume less than or equal to four times the volume of the actuator within the potting chamber. The operating chamber may be configured so that the second end of the actuator deflects through more than one quarter the volume of the operating chamber when flexing between the closed position and the open position.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Figure 1A:
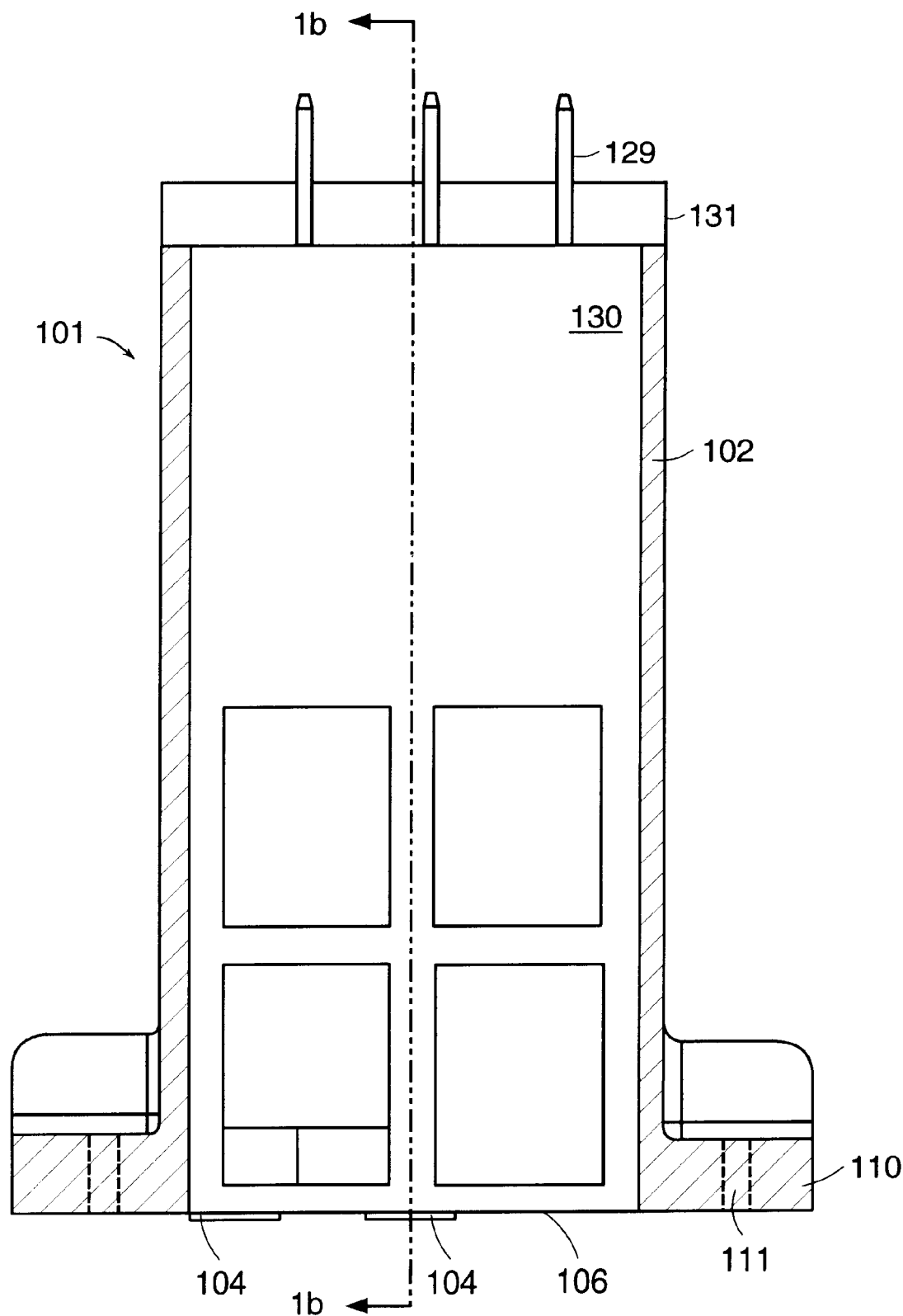
FIG. 1A is a top view of a two-way valve embodiment of the present invention.
Figure 1B:
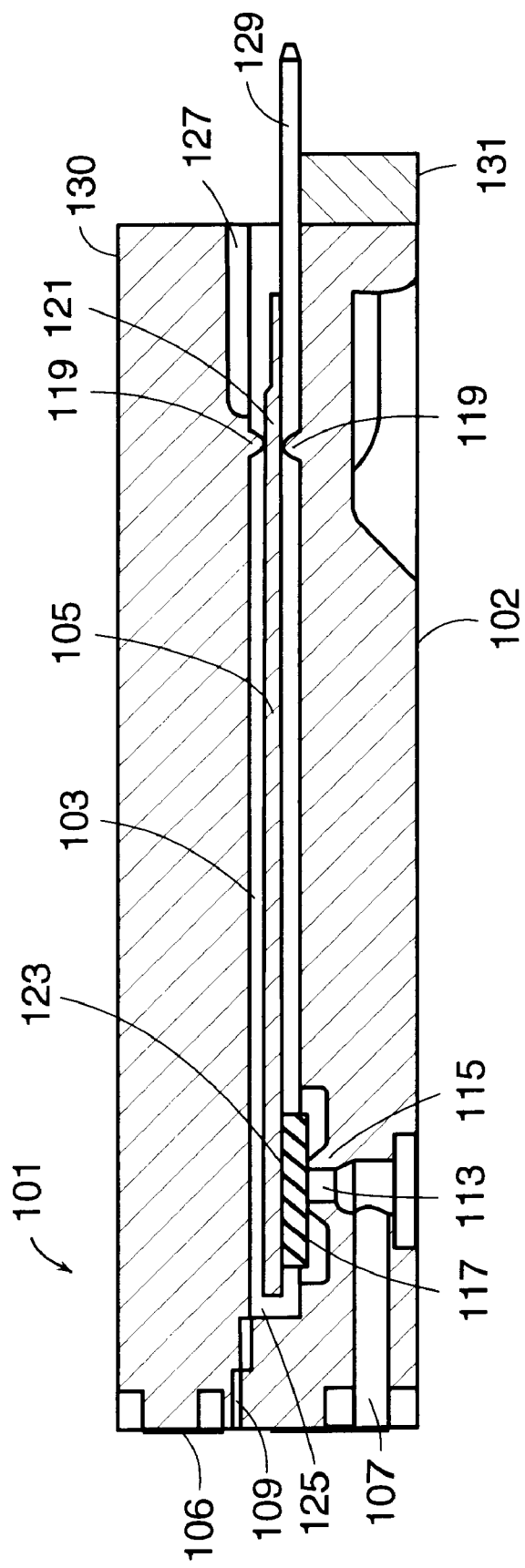
FIG. 1B is a cross-sectional view of the valve shown in FIG. 1A.

A preferred embodiment of the present invention is a simple, low-cost, piezoelectric-actuated valve suitable for a wide range of applications. FIGS. 1A and 1B illustrate a two-way valve embodiment of the present invention showing respectively a top view and a cross-sectional view of such an embodiment. Valve 101 has a valve body which includes a valve base 102 and a top cover 130 that together define a cavity 103, within which is positioned a piezoelectric actuator 105 having a rigidly fixed end 121 and a free end 123. The cavity 103 has connected thereto, a first port 107 in fluid communication via the cavity 103 with a second port 109. As shown in FIG. 1B, the first port 107 and the second port 109 are preferably adjacent to each other in the same plane and have external openings in a common external surface 106. Alternatively, the valve 101 may be configured and operated using the port 109 as the first port, and the port 107 as the second port.

An embodiment may also include an o-ring seal 104 around each of the openings in the common external surface 106 for ports 107 and 109 to prevent leaks when the valve 101 is mounted to a valve manifold. When the external openings for ports 107 and 109 are adjacent to each other in the same plane, the o-ring seal 104 may be a single integrated piece, or separate seals for each port. Similarly, an embodiment also may include having the common external surface 106 as part of a valve mounting flange 110 having a mounting hole 111 to aid in the mounting of the valve 101 to a valve manifold.

In a preferred embodiment, generally opposed actuator mounts 119, which are non-adjustable and integral to the valve body, divide the cavity 103 into an operating chamber 125 and a potting chamber 127. Preferably, the volumes of the operating chamber 125 and the potting chamber 127 are minimized. Minimizing the volume of the operating chamber results in reduced "dead volume" of fluid trapped within the valve 101. Minimizing the volume of the potting chamber 127 reduces problems with shrinkage of the potting material filling the volume as described below. For example, the volume of the operating chamber 125 and/or the potting chamber 127 may be less than or equal to four times the volume of the portion of the actuator 105 within the chamber. Alternatively, the operating chamber 125 may be configured so that the free end 123 of the actuator 105 deflects through more than one quarter the volume of the operating chamber when flexing between operating positions. The volume of the operating chamber 125 may also be minimized, as shown in FIG. 1B by locating the valve seat 115 in a recess in one of the enclosing walls of the operating chamber 125. A valve seat pad 117 is attached to the free end 123 of the actuator 105 so that when the valve 101 is in a closed position, the pad extends into the recess past a plane defined by the wall of the operating chamber 125. The valve seat pad 117 should be composed of an elastomeric material that can easily deform, in response to a small force, around the valve seat 115 to form a fluid seal. In a preferred embodiment, the valve seat pad 117 is made of silicone rubber.

The valve 101 may be structured so that one of the actuator mounts is integral with the top cover portion 130 of the valve body, while the other actuator mount is integral with the valve base 102 portion of the valve body. The fixed end 121 of the actuator 105 is rigidly positioned cantilever-style between the opposing actuator mounts 119. The fixed end 121 of the actuator 105 has electric contacts 129 to control the actuator 105, and the potting chamber 127 is partially or entirely filled with potting material, typically epoxy, which rigidly holds in place the fixed end 121 of the actuator 105.

A preferred embodiment also includes an actuator controller 131 which includes one or more of an actuator voltage module, a status transducer, and a local processor controller. In order to activate the actuator 105, a relatively high potential must be applied, typically, about 200 volts. If the high voltage control components are separate from the valve 101, electrical code requirements place a substantial burden on the allowable wiring and on the separation spaces required for the circuit layout. This adds a significant cost and size penalty to the system unit. By integrating the high voltage electronics into actuator controller 131 in the valve base 102, the valve itself may be controlled by relatively low voltage signals, e.g., 3 to 24 volts using standard low-cost wiring and design layouts. The incorporation of the status transducer into the actuator controller 131 allows for communication with the control processor through the same low voltage wiring. This allows feedback from the transducer to the control processor, and enables intelligent control of the valve. For example, a pressure transducer may be mounted on the valve base 102 to measure the cavity pressure. The signal from the pressure transducer may then be used to confirm the operation of the valve 101 and thus provide for a measure of fault protection. Alternatively, the signal from the pressure transducer may be used to calculate the fluid flow rate when the valve 101 is used as a proportional valve.

The first port 107 may be configured to introduce fluid into the valve 101. In a preferred embodiment, the first port 107 is connected to the operating chamber 125 of the cavity 103 via a first port passage 113 through a protruding valve seat, also called a volcano 115, which is non-adjustable and integral to the valve body, and which extends into the operating chamber 125. The free end 123 of the actuator 105 may be fully or partially encased in, or have attached thereto, resilient material that, in a preferred embodiment, is in the form of a valve seat pad 117 adhesively attached to the free end 123 of the actuator 105. The valve seat pad 117 rests sealingly on the volcano 115 to prevent fluid flow through the valve 101, and lifts off the volcano 115 to allow fluid flow through the valve 101. The second port 109, being in fluid communication with the operating chamber 125, may allow fluid in the operating chamber 125 to flow out of the valve 101.

In a preferred embodiment, the first port 107 and the second port 109 are disposed to emerge from a single common external surface 106 of the valve 101. This arrangement facilitates the use of multiple such valves positioned on a single-flow system manifold. In such a multiple-valve system, use of a single valve manifold reduces assembly cost and overall system size. Proper selection of the common external port surface permits either a small individual valve footprint on the valve manifold, or a low valve profile.

To operate the actuator 105, an electric potential is applied via the electric contacts 129 attached to the fixed end 121. In a preferred embodiment, when no potential is applied to the actuator 105, the valve seat pad 117 on the free end 123 of the actuator 105 rests on the valve seat volcano 115. Although the valve seat pad 117 covers the volcano 115, there is no fluid seal because the valve seat pad 117 has not deformed over the volcano 115. The deformation of the valve seat pad 117 over the volcano 115 creates the fluid seal isolating the first port passage 113 from the cavity 103. This is the preferred neutral position of the actuator 105 because it allows maximum force to be available, since only displacement sufficient to cause the deformation of the valve seat pad 117 is required of the free end 123 of the actuator 105. When a first polarity electric potential is applied to the actuator 105, the piezoelectric effect causes the free end 123 of the actuator 105 to flex towards the volcano 115 with maximum force so that the valve seat pad 117 rests sealingly thereon, preventing fluid flow through the valve 101. This arrangement also allows for a relatively large displacement of the free end 123 of the actuator 105 away from the volcano 115 when a second opposite polarity electric potential is applied to the actuator 105, permitting maximum fluid flow through the valve 101.

When the free end 123 of the actuator 105 presses the valve seat pad 117 against the volcano 115, the resulting interaction forms a leakproof seal. The valve seat pad 117 deforming around the raised lip at the end of the volcano 115 results in such a leakproof seal. In one representative embodiment, the valve seat could extend into the operating chamber 125 in a cylindrical shape, rather than the sloping sides of the volcano shape. In another embodiment, the raised lip of the valve seat need not be at the very end of the valve port, as in the volcano design, but may be some radial distance from the port proper so long as it completely surrounds the port and so long as the valve seat pad is large enough to completely engage the lip.

The volcano shape does offer operational advantages not realized in other styles and shapes of valve seat, specifically, with respect to entrance and exit flow losses, since the valve seat is an entrance/exit orifice that contributes to the overall fluid flow resistance. The volcano shape minimizes this flow resistance. As a result, the free end 123 of the actuator 105 needs to travel a relatively shorter distance above the end of the valve seat to permit maximum fluid flow through the valve.

For example, in one typical prior art design, the free end of the piezoelectric actuator must be displaced approximately one half valve port diameter above the valve seat before maximum fluid flow through the valve is achieved. The volcano-shaped valve seat of a preferred embodiment, on the other hand, requires only that the actuator be moved one quarter of the port diameter above the valve seat. Since, as previously discussed, a trade-off must be made between actuator displacement and actuator force, reducing the required displacement increases ability to form a positive seal between the actuator and the valve seat.

Figure 3:
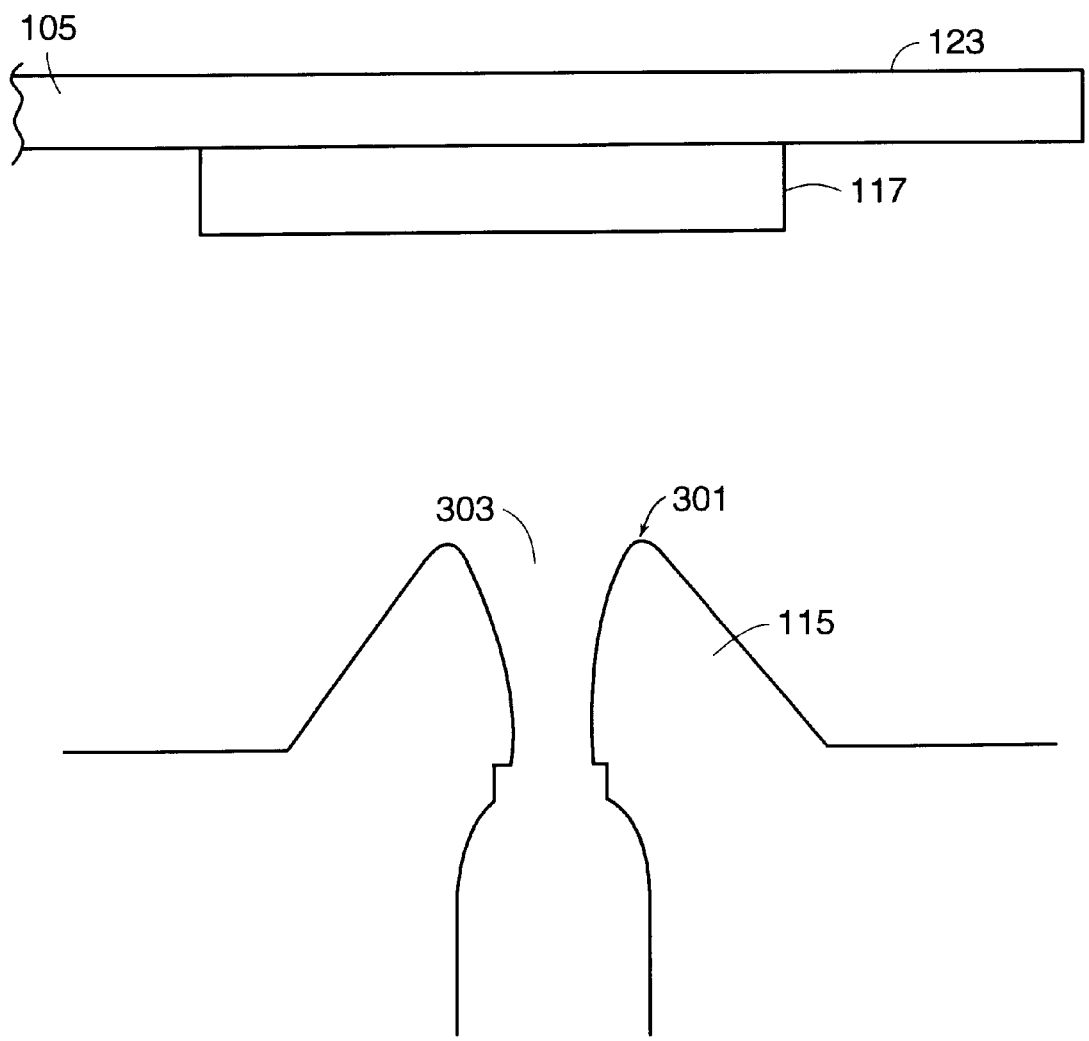
FIG. 3 illustrates the end tip of a protruding valve seat volcano.

The end tip 301 of the valve seat volcano 115 is shown in FIG. 3. The end tip 301 has a small radius of curvature that transitions to a larger radius of curvature as the flow channel 303 enters the valve port volcano 115. The slope of the volcano 115 is roughly 45 degrees in a preferred embodiment, but that particular angle is not required. The small radius of curvature at the end tip 301 of the volcano 115 provides the valve seat pad 117 of the actuator 105 with a structure around which to deform and thereby create a leakproof seal. The gradual widening of the flow channel 303 and the external slope of the volcano 115 reduce the orifice losses and increase the maximum flow rate through the valve 101.

Figure 2A:
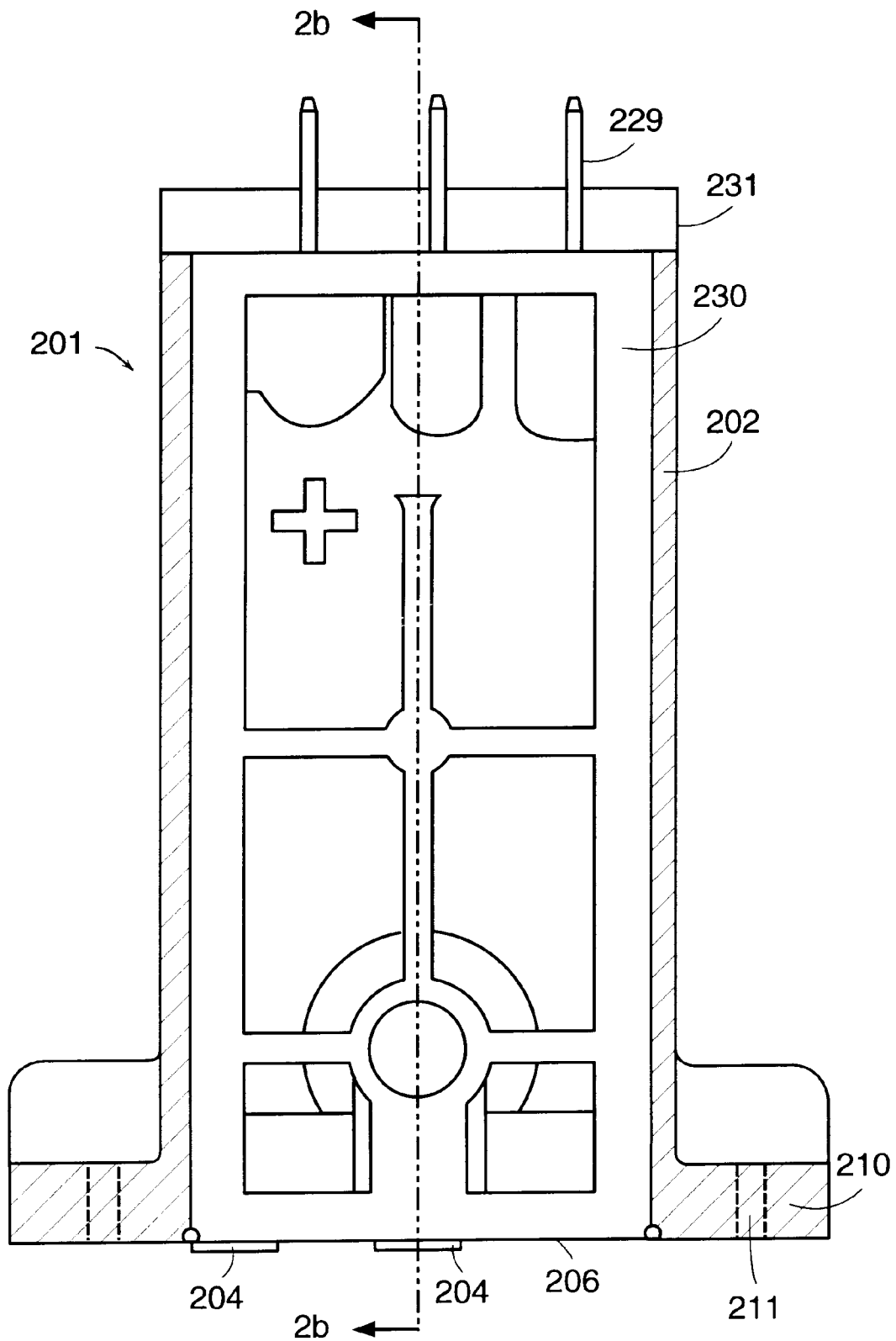
FIG. 2A is a top view of a three-way valve embodiment of the present invention.
Figure 2B:
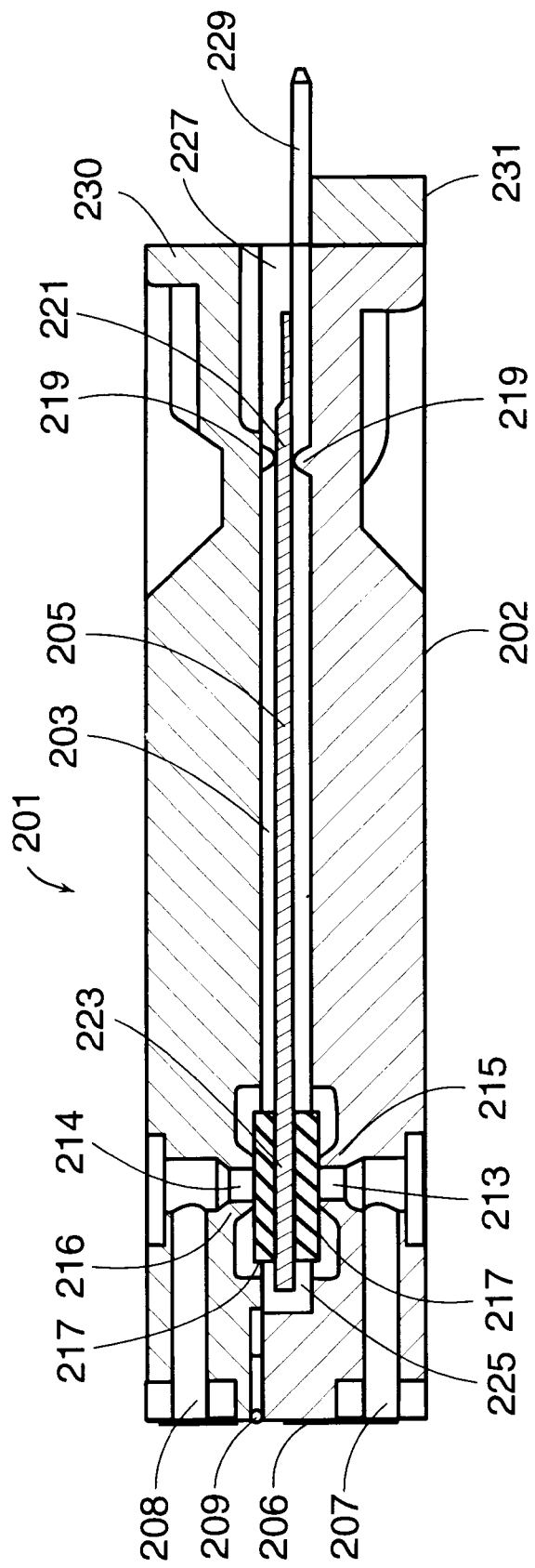
FIG. 2B is a cross-sectional view of the valve shown in FIG. 2A.

FIGS. 2A and 2B illustrate a three-way valve embodiment of the present invention showing respectively a top view and a cross-sectional view of such an embodiment. The valve body respectively has a valve base 202 and a top cover 230 that together define a cavity 203, within which is positioned a piezoelectric actuator 205 having a rigidly fixed end 221 and a free end 223. The cavity 203 has connected thereto, a first port 207, a second port 208, and a common port 209. As shown in FIG. 2B, the first port 207, the second port 208, and the common port 209 are preferably mutually adjacent to each other in the same plane. As in the two-way valve, an embodiment of a three-way valve may also include arranging the positioning of the first port 207, second port 208, and common port 209 so that all three emerge from a common external surface 206 of the valve 201 which is substantially planar. In one embodiment, one or more of the ports, e.g., the second port 208, may be integral with the top cover 230 portion of the valve body, while the remaining ports are integral with the valve base 202 portion of the valve body.

An embodiment may also include an o-ring seal 204 around each of the ports 207, 208, and 209 to prevent leaks when the valve 201 is mounted to a valve manifold. When the external openings for ports 207, 208 and 209 are adjacent to each other in the same plane, the o-ring seal 204 may be a single integrated piece, or separate seals for each port opening. A related embodiment also may include having the common external surface 206 as part of a valve mounting flange 210 having a mounting hole 211 to aid in the mounting of the valve 201 to a valve manifold.

In a preferred embodiment, generally opposed actuator mounts 219, which are non-adjustable and integral to the valve body, divide the cavity 203 into an operating chamber 225 and a potting chamber 227. Preferably, the volumes of the operating chamber 225 and the potting chamber 227 are minimized as discussed with respect to the two-way valve. For example, the volume of the operating chamber 225 and/or the potting chamber 227 may be less than or equal to four times the volume of the portion of the actuator 205 within the chamber. Alternatively, the operating chamber 225 may be configured so that the free end 225 of the actuator 205 deflects through more than one quarter the volume of the operating chamber when flexing between operating positions. As in the two-way valve, the volume of the operating chamber 225 may also be minimized, as shown in FIG. 2B, by locating either or both of the valve seats 215 and 216 in a corresponding recess in one of the enclosing walls of the operating chamber 225 and encasing the free end 223 of the actuator 205 in a resilient valve seat pad 217 which, when one of the ports 207 or 208 is closed, extends into the corresponding recess past a plane defined by the wall of the operating chamber 225.

As in the two-way valve, a preferred embodiment of the three-way valve 201 may be structured so that one of the actuator mounts is integral with the top cover 230 portion of the valve body, while the other actuator mount is integral with the valve base 202 portion of the valve body. The fixed end 221 of the actuator 205 is rigidly positioned cantilever-style between the opposing actuator mounts 219. The fixed end 221 of the actuator 205 has electric contacts 229 attached to control the actuator 205, and the potting chamber 227 is partially or entirely filled with potting material, typically epoxy, which rigidly holds in place the fixed end 221 of the actuator 205. As in the two-way valve, an embodiment of a three-way valve may also include incorporating into the valve 201 an actuator controller (not shown) having one or more of an actuator voltage module, a status transducer, and a local controller processor.

In a preferred embodiment, the first port 207 is connected to the operating chamber 225 of the cavity 203 via an inlet passage 213 within a first port volcano 215, which protrudes into the operating chamber 225. The second port 208 is connected to the operating chamber 225 via an inlet passage 214 through a second port volcano 216, which protrudes into the operating chamber 225. The first port volcano 215 and the second port volcano 216 are both non-adjustable and integral to the body of the valve 201. The free end 223 of the actuator 205 may be fully or partially encased in, or have attached thereto, resilient material that, in a preferred embodiment, is in the form of a valve seat pad 217, which comprises two sections adhesively attached to opposite sides of the free end 223 of the actuator 205. In operation, the valve seat pad 217 presses sealingly against one of the volcanos so as to prevent fluid flow through that port, and away from the other volcano so as to allow fluid flow between the port associated with the other volcano and the common port 209.

In a preferred embodiment, when no potential is applied to the actuator 205, the valve seat pad 217 on the free end 223 rests against the first port volcano 215, but does not seal it because the valve seat pad 217 has not deformed over the volcano 215. To operate the actuator 205 so as to prevent fluid flow between the first port 207 and the common port 209, while allowing fluid flow between the second port 208 and the common port 209, a first polarity electric potential is applied via the electric contacts 229 attached to the fixed end 221. This flexes the free end 223 of the actuator 205 against the first port volcano 215 with maximum force so that the valve seat pad 217 deforms over the first port volcano 215 to form a seal that prevents fluid flow between the first port 207 and the common port 209, while allowing maximum fluid flow between the second port 208 and the common port 209.

When an opposite second polarity electric potential is applied via the electric contacts 229 attached to the fixed end 221 of the actuator 205, the piezoelectric effect causes the free end 223 of the actuator 205 to flex away from the first port volcano 215 and the valve seat pad 217 to sealingly engage the second port volcano 216. This prevents fluid flow between the second port 208 and the common port 209, while allowing maximum fluid flow between the first port 207 and the common port 209.

In an alternate embodiment, when no potential is applied to the actuator 205, the valve seat pad 217 on the free end 223 rests against the second port volcano 216, but does not seal it because the valve seat pad 217 has not deformed over the volcano 216. To operate the actuator 205 so as to prevent fluid flow between the second port 208 and the common port 209, while allowing fluid flow between the first port 207 and the common port 209, a first polarity electric potential is applied via the electric contacts 229 attached to the fixed end 221. The piezoelectric effect causes the free end 223 of the actuator 205 to flex against the second port volcano 216 with maximum force so that the valve seat pad 217 deforms over the second port volcano 216 to form a seal that prevents fluid flow between the second port 208 and the common port 209, while allowing maximum fluid flow between the first port 207 and the common port 209.

When an opposite second polarity electric potential is applied via the electric contacts 229 attached to the fixed end 221 of the actuator 205, the piezoelectric effect causes the free end 223 of the actuator 205 to flex away from the second port volcano 215 and the valve seat pad 217 to sealingly engage the first port volcano 215. This prevents fluid flow between the first port 207 and the common port 209, while allowing maximum fluid flow between the second port 208 and the common port 209.

An embodiment of the present invention is also directed to a method of manufacturing a valve with a piezoelectric actuator, such as shown in FIGS. 1A and 1B. The procedure to attach the piezoelectric actuator 105 to the valve base 102 begins with the actuator 105 receiving a series of electrical checks for proper operation, after which three electric contacts 129 are attached to the actuator 105.

The valve seat pad 117 is attached to the end of the actuator 105. Then, the actuator 105 is placed in the valve base 102 so that the fixed end 121 rests on one actuator mount 119 with the volcano 115 centered on the valve seat pad 117. Significantly, the actuator 105 is placed in position without deformation or stress to ensure proper neutral position (zero applied potential). Positioning of the actuator 105 may utilize a special positioning fixture that includes two spring-loaded supports that provide structural support at the points on the actuator 105 where the fixed end 121 rests on the actuator mount 119 and where the free end 123 seals the volcano 115. The fixture also supplies a vacuum pressure to the volcano 115 via the first port 107, thereby ensuring that the valve seat pad 117 is in proper contact with the end of the volcano 115.

The thickness of the actuator 105 and the valve seat pad 117 is tightly controlled, as is the relative relationship of the end of the volcano 115 and the actuator mounts 119. If necessary, different thickness adhesive tapes may be used either as a shim to aid in achieving the proper geometry of the actuator 105 and the valve seat pad 117, or to attach the valve seat pad 117 to the actuator 105. Selection of proper thickness tape may in part be determined by inspecting the pieces of the body of the valve 101 and measuring the distance from the top of the volcano 115 to the top of the valve base 102.

To complete assembly of the valve, adhesive is applied into the potting chamber 127 in the rear of the valve base 102 to the intersection of the actuator mount 119 and the actuator 105, allowing the adhesive to wick underneath the actuator 105, and the adhesive joint is cured. A preferred embodiment uses ultraviolet-curable glue and ultraviolet-transparent housing materials which allow the adhesive joint to set up very rapidly under ultraviolet light without requiring excessive temperatures or time. Use of a transparent housing also has the advantage of allowing for visual inspection of the placement of the actuator 105 during assembly of the valve. The assembly is inspected to verify that the ultraviolet curable glue wicked across the entire contact line between the actuator 105 and the actuator mount 119, so that the actuator 105 is secure. At this point, the actuator may be removed from the mounting fixture. Then, the top cover 130 is attached to the valve base 102. Finally, the potting chamber 127 of the valve 101 is filled with adhesive until the fixed end 121 of the actuator 105 is completely covered, and the exposed edge is cured.

In manufacturing a three-way valve 201 in FIGS. 2A and 2B, the actuator 205 is placed within the valve base 202 without flexing or deformation so that the fixed end 221 rests on one actuator mount 219, while the valve seat pad 217 rests on one of the volcanoes 215 or 216. This will allow for maximum sealing force between the valve seat pad and the selected volcano 215 or 216 when that volcano's associated port is desired to be shut, with flow allowed through the other, unsealed volcano and port.

In a further and related embodiment, the actuator 205 is placed on the valve base 202 such that the valve seat pad 217 covers the volcano seat 215 in the base. The actuator 205 is tacked into place by injecting UV curable glue into the potting chamber 227 between the valve base 202 and the actuator 205. The actuator 205 is connected to a power supply and the appropriate voltage is applied to the actuator such that the actuator bends away from the volcano seat 215 in the base 202 to the maximum extent possible.

The top cover 230 is attached to a means for measuring the force on the top cover, such as a force gauge or balance, and is lowered onto the base 230. The lip on the base 202 that seats the top cover 230 is dimensioned so that the cover can be positioned on the lip without force. The depth of the lip is dimensioned to accommodate the expected manufacturing variations in the dimensions of the base 202 and top cover 230. Selection of the lip clearance dimension and depth is well-known to one of ordinary skill in the mechanical arts. As the top cover 230 is lowered onto the base 202, the top cover will contact the fully extended actuator 205 which will produce an upward force on the top cover as the cover is lowered further. The top cover 230 is lowered until the upward force produced by the actuator 205 on the top cover matches the minimum closing force. The minimum closing force is determined by balancing several factors such as the deformation characteristics of the valve seat 216 and the force-displacement characteristics of the actuator 205, and is chosen to provide an adequate sealing force to seal the volcano valve seat 216 in the top cover 230. The selection of the minimum closing force is well known to one of ordinary skill in the mechanical arts. In a preferred embodiment of the invention, the specific value of the minimum closing force is 25 gram-force.

The top cover 230 is held in this position while UV curable glue is applied to the lip on the base 202. The UV curable glue is sufficiently fluid so that the glue is wicked completely into the space between the lip of the base 202 and the top cover 230. A UV source is applied to the valve 201 to cure the glue, making a rigid and leakproof seal between the top cover 230 and the base 202. The remaining portion of the potting chamber 227 between the actuator 205 and the top cover 230 is filled with the UV curable glue and cured with the UV source.

What is claimed is:

1. A valve comprising:
   a valve body having:
   (i) an internal valve cavity,
   (ii) a pair of generally opposed positioning members integral to the valve body,
   (iii) first and second ports, at least one of the ports including a valve seat and a passageway in communication with the valve seat, the seat and the passageway being integrally formed in the valve body, and
   (iv) a plurality of external surfaces, one of the external surfaces having a manifold mounting flange structure including openings for the first and second ports; and
   a piezoelectric actuator having first and second ends, the first end being secured within the valve cavity between the positioning members and having electrical contacts for providing an electric potential to control the position of the second end, and the second end being capable of flexing between a closed position with respect to the valve seat and an open position with respect to the valve seat.

2. A valve according to claim 1, wherein the valve body includes a valve housing having one of the positioning members, and a valve cover having the other positioning member.

3. A valve according to claim 1, wherein the actuator further includes a valve seat pad attached to the second end to sealingly engage the second end against the valve seat when the second end is in the closed position.

4. A valve according to claim 1, wherein the piezoelectric actuator lies in a plane substantially parallel to the external surface having the port openings.

5. A valve according to claim 1, wherein the piezoelectric actuator lies in a plane substantially perpendicular to the external surface having the port openings.

6. A valve according to claim 1, further including an integrated seal associated with the external surface openings for the first and second ports.

7. A valve according to claim 1, further comprising:
   an actuator voltage module integrated into the valve body and electrically connected to the electrical contacts of the piezoelectric actuator, the module generating the electric potential to control the second end of the piezoelectric actuator.

8. A valve according to claim 1, further comprising:
   a control processor integrated into the valve body and electrically connected to the electrical contacts of the piezoelectric actuator, the processor controlling fluid flow through the valve by controlling the position of the second end of the piezoelectric actuator.

9. A valve according to claim 1, further comprising:
   a pressure transducer in communication with the valve cavity that monitors fluid pressure within the valve cavity for at least one of controlling fluid flow through the valve and detecting faulty valve operation.

10. A valve according to claim 1, wherein the first end of the actuator is held within a potting chamber portion of the valve cavity that is substantially filled with potting material to enhance the securing of the first end of the piezoelectric actuator by the positioning members.

11. A valve according to claim 1, wherein the valve seat protrudes into the cavity.

12. A valve according to claim 11, wherein the valve seat has a top that is radially surrounded by a valve seat lip.

13. A valve according to claim 11, wherein the valve seat has a cylindrical shape.

14. A valve according to claim 11, wherein the valve seat has a volcano shape.

15. A valve according to claim 14, wherein the valve seat includes an end tip having a relatively small radius of curvature that gradually increases to a relatively larger radius of curvature so as to form a transition to the port passageway.

16. A valve comprising:
    a valve body having:
        (i) an internal valve cavity,
        (ii) a pair of generally opposed positioning members integral to the valve body, and
        (iii) first and second ports, at least one of the ports including a valve seat and a passageway in communication with the valve seat, the seat and the passageway being integrally formed in the valve body; and
    a piezoelectric actuator having first and second ends, the first end being secured within the valve cavity between the positioning members and having electrical contacts for providing an electric potential to control the position of the second end, and the second end being capable of flexing between a closed position with respect to the valve seat and an open position with respect to the valve seat, wherein the portion of the valve cavity containing the first end of the actuator has a volume less than or equal to four times the volume of the first end of the actuator within the portion.

17. A valve comprising:
    a valve body having:
        (i) an internal valve cavity,
        (ii) a pair of generally opposed positioning members integral to the valve body, and
        (iii) first and second ports, at least one of the ports including a valve seat and a passageway in communication with the valve seat, the seat and the passageway being integrally formed in the valve body; and
    a piezoelectric actuator having first and second ends, the first end being secured within the valve cavity between the positioning members and having electrical contacts for providing an electric potential to control the position of the second end, and the second end being capable of flexing between a closed position with respect to the valve seat and an open position with respect to the valve seat, wherein the portion of the valve cavity containing the second end of the actuator has a volume less than or equal to four times the volume of the second end of the actuator within the portion.

18. A valve comprising:
    a valve body having:
        (i) an internal valve cavity,
        (ii) a pair of generally opposed positioning members integral to the valve body, and
        (iii) first and second ports, at least one of the ports including a valve seat and a passageway in communication with the valve seat, the seat and the passageway being integrally formed in the valve body; and
    a piezoelectric actuator having first and second ends, the first end being secured within the valve cavity between the positioning members and having electrical contacts for providing an electric potential to control the position of the second end, and the second end being capable of flexing between a closed position with respect to the valve seat and an open position with respect to the valve seat, wherein the portion of the valve cavity containing the second end of the actuator is configured so that the second end of the actuator deflects through more than one quarter the volume of the portion when flexing between the closed position and the open position.

19. A method of manufacturing a piezoelectric actuated valve, the method comprising:
    providing a valve body having:
        (i) an internal valve cavity,
        (ii) a pair of generally opposed positioning members integral to the valve body,
        (iii) first and second ports, at least one of the ports including a valve seat and a passageway in communication with the valve seat, the seat and the passageway being integrally formed in the valve body, and
        (iv) a plurality of external surfaces, one of the external surfaces having a manifold mounting flange structure including openings for the first and second ports; and
    suspending a piezoelectric actuator having first and second ends, the first end having electrical contacts for providing an electric potential to control the position of the second end, so that the first end contacts one of the positioning members and the second end contacts the valve seat without bending or flexing the actuator; and
    securing the first end of the piezoelectric actuator to the positioning members.

20. A method according to claim 19, wherein, before suspending the actuator, the method further comprises:
    attaching a valve seat pad to the second end of the piezoelectric actuator.

21. A method according to claim 19, wherein suspending the actuator includes supplying a vacuum pressure to the passageway so that the second end of the piezoelectric actuator is held against the valve seat.

22. A method according to claim 19, wherein the suspending utilizes a special positioning fixture to hold and position the piezoelectric actuator.

23. A method according to claim 19, wherein the suspending utilizes shimming tapes to position the piezoelectric actuator.

24. A method according to claim 19, wherein the securing utilizes ultraviolet curable adhesive.

25. A method according to claim 19, wherein the securing substantially fills a potting chamber portion of the valve cavity with adhesive material.

26. A method according to claim 19, wherein the method further comprises:
    attaching a top cover over the valve body to enclose the valve cavity such that the valve cavity is accessible to fluid only via the valve ports.

27. A valve comprising:
    a valve body having an internal valve cavity, and first and second ports, at least one of the ports including a valve seat and a passageway in communication with the valve seat, the seat and the passageway being integrally formed in the valve body, the valve body including a plurality of external surfaces, one of the external surfaces having a manifold mounting flange structure including openings for the first and second ports; and
    a valve actuator capable of operating between a closed position with respect to the valve seat and an open position with respect to the valve seat,
    wherein the valve seat has a volcano shape including an end tip having a relatively small radius of curvature that gradually increases to a relatively larger radius of curvature so as to form a transition to the port passageway.

28. A valve according to claim 27, wherein the actuator further includes a valve seat pad to sealingly engage the actuator against the valve seat when the actuator is in the closed position.

29. A valve according to claim 27, wherein the piezoelectric actuator lies in a plane substantially parallel to the external surface having the port openings.

30. A valve according to claim 27, wherein the piezoelectric actuator lies in a plane substantially perpendicular to the external surface having the port openings.

31. A valve according to claim 27, further including an integrated seal associated with the external surface openings for the first and second ports.

32. A valve according to claim 27, further comprising:
a control processor integrated into the valve body and electrically connected to the actuator, the processor controlling fluid flow through the valve by controlling the position of the actuator.

33. A valve according to claim 27, further comprising:
a pressure transducer in communication with the valve cavity that monitors fluid pressure within the valve cavity for at least one of controlling fluid flow through the valve and detecting faulty valve operation.

34. A valve comprising:
a valve body having an internal valve cavity, and first and second ports, at least one of the ports including a valve seat and a passageway in communication with the valve seat, the seat and the passageway being integrally formed in the valve body; and
a valve actuator capable of operating between a closed position with respect to the valve seat and an open position with respect to the valve seat,
wherein the valve seat has a volcano shape including an end tip having a relatively small radius of curvature that gradually increases to a relatively larger radius of curvature so as to form a transition to the port passageway, wherein the valve cavity has a volume less than or equal to four times the volume of the actuator within the cavity.

35. A valve comprising:
a valve body having:
(i) an internal valve cavity,
(ii) a pair of generally opposed positioning members integral to the valve body, which divide the cavity into an operating chamber and a potting chamber, wherein the operating chamber is defined in part by first and second chamber walls, and
(iii) first and second ports, at least one of the ports including a valve seat and a passageway in communication with the valve seat, wherein the valve seat is located in a recess in the first wall;
a piezoelectric actuator having first and second ends, the first end being secured within the valve cavity between the positioning members and having electrical contacts for providing an electric potential to control the position of the second end, and the second end being capable of flexing between a closed position with respect to the valve seat and an open position with respect to the valve seat; and
a valve seat pad mounted on the second end of the piezoelectric actuator for sealing the valve seat when the piezoelectric actuator is in the closed position;
wherein the valve seat pad extends into the recess, past a plane defined by the first wall, when the piezoelectric actuator is in the closed position.

36. A valve according to claim 35, wherein the valve seat extends into the recess.

37. A valve according to claim 35, wherein the valve body includes a valve housing having one of the positioning members, and a valve cover having the other positioning member.

38. A valve according to claim 35, wherein the valve seat has a top that is radially surrounded by a valve seat lip.

39. A valve according to claim 35, wherein the valve seat has a cylindrical shape.

40. A valve according to claim 35, wherein the valve seat has a volcano shape.

41. A valve according to claim 40, wherein the valve seat includes an end tip having a relatively small radius of curvature that gradually increases to a relatively larger radius of curvature so as to form a transition to the port passageway.

42. A valve according to claim 35, wherein the potting chamber has a volume less than or equal to four times the volume of the actuator within the potting chamber.

43. A valve according to claim 35, wherein the operating chamber has a volume less than or equal to four times the volume of the actuator within the operating chamber.

44. A valve according to claim 35, wherein the operating chamber is configured so that the second end of the actuator deflects through more than one quarter the volume of the operating chamber when flexing between the closed position and the open position.

45. A valve comprising:
a valve body having:
(i) an internal valve cavity,
(ii) first and second ports, at least one of the ports including a valve seat, and
(iii) a plurality of external surfaces, one of the external surfaces having a manifold mounting flange structure and including openings for the first and second ports; and
a piezoelectric actuator having first and second ends, the first end being secured within the valve cavity and having electrical contacts for providing an electric potential to control the position of the second end, and the second end being capable of flexing between a closed position with respect to the valve seat and an open position with respect to the valve seat.

46. A valve comprising:
a valve body having:
(i) an internal valve cavity, and
(ii) first and second ports, at least one of the ports including a valve seat; and
a piezoelectric actuator having first and second ends, the first end being secured within the valve cavity and having electrical contacts for providing an electric potential to control the position of the second end, and the second end being capable of flexing between a closed position with respect to the valve seat and an open position with respect to the valve seat, wherein the portion of the valve cavity containing the first end of the actuator has a volume less than or equal to four times the volume of the first end of the actuator within the portion.

47. A valve comprising:
a valve body having:
(i) an internal valve cavity, and
(ii) first and second ports, at least one of the ports including a valve seat; and
a piezoelectric actuator having first and second ends, the first end being secured within the valve cavity and having electrical contacts for providing an electric potential to control the position of the second end, and the second end being capable of flexing between a closed position with respect to the valve seat and an open position with respect to the valve seat, wherein the portion of the valve cavity containing the second end of the actuator has a volume less than or equal to four times the volume of the second end of the actuator within the portion.

48. A valve comprising:

a valve body having:
(i) an internal valve cavity, and
(ii) first and second ports, at least one of the ports including a valve seat; and a piezoelectric actuator having first and second ends, the first end being secured within the valve cavity and having electrical contacts for providing an electric potential to control the position of the second end, and the second end being capable of flexing between a closed position with respect to the valve seat and an open position with respect to the valve seat, wherein the portion of the valve cavity containing the second end of the actuator is configured so that the second end of the actuator deflects through more than one quarter the volume of the portion when flexing between the closed position and the open position.

49. A valve comprising:

a valve body having:
(i) a first valve body having an integral positioning member,
(ii) a second valve body having an integral positioning member, the first and second valve bodies being attached to each other to form a first internal cavity and a second internal cavity separated by the integral positioning members located generally opposite each other, and
(iii) first and second ports, at least one of the ports including a valve seat and a passageway in communication with the valve seat, the seat and the passageway being integrally formed in the valve body; and a piezoelectric actuator having first and second ends, the first end being secured within the first internal cavity between the positioning members by adhesive material, and having electrical contacts for providing an electric potential to control the position of the second end, the second end being capable of flexing within the second valve cavity between a closed position with respect to the valve seat and an open position with respect to the valve seat.

* * * * *